(12) United States Patent
Quayle

(10) Patent No.: US 6,262,997 B1
(45) Date of Patent: *Jul. 17, 2001

(54) SYNCHRONIZATION IN DIGITAL COMMUNICATIONS NETWORKS

(75) Inventor: John Alan Quayle, Ipswich (GB)

(73) Assignee: British Telecommunications, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,586

(22) PCT Filed: Jun. 27, 1996

(86) PCT No.: PCT/GB96/01556

§ 371 Date: Dec. 29, 1997

§ 102(e) Date: Dec. 29, 1997

(87) PCT Pub. No.: WO97/01896

PCT Pub. Date: Jan. 16, 1997

(30) Foreign Application Priority Data

Jun. 27, 1995 (EP) .................................................. 95304531

(51) Int. Cl.$^7$ ...................................................... H04J 3/06
(52) U.S. Cl. ............................................................ 370/503
(58) Field of Search ................................... 370/294, 301, 370/312, 314, 345, 347, 395, 442, 458, 475, 503

(56) References Cited

U.S. PATENT DOCUMENTS

| 5,357,360 | * | 10/1994 | Imhoff et al. | 359/125 |
| 5,422,968 | | 6/1995 | Hanatani et al. | |
| 5,509,003 | * | 4/1996 | Snijders et al. | 370/294 |
| 5,606,555 | * | 2/1997 | Singer | 370/465 |
| 5,619,504 | * | 4/1997 | Van Grinsven et al. | 370/347 |

FOREIGN PATENT DOCUMENTS

| 0 437 350 A1 | * | 7/1991 | (EP) | H04Q/11/04 |
| 0 318 332 B1 | | 7/1993 | (EP) | . |
| 0 585 087 A1 | | 3/1994 | (EP) | . |
| 0 597 720 A2 | * | 5/1994 | (EP) | H04L/7/02 |
| 0 616 443 A2 | | 9/1994 | (EP) | . |
| 0 616 443 A3 | | 9/1994 | (EP) | . |
| 0 616 444 A2 | | 9/1994 | (EP) | . |
| WO 88/09093 | | 11/1988 | (WO) | . |
| WO 96/16490 | | 5/1996 | (WO) | . |

OTHER PUBLICATIONS

"The provision of telephony over passive optical networks", Hoppitt et al., Br. Telecom Technology Journal, vol. 7, No. 2, Apr. 1989.

"Design of passive optical networks," Reeve et al., Br. Telecom Technology Journal, vol. 7, No. 2, Apr. 1989.

"Ranging on Advanced PONs," Quayle, Jun. 1995.

* cited by examiner

*Primary Examiner*—Hassan Kizou
*Assistant Examiner*—Ahmed Elallam
(74) *Attorney, Agent, or Firm*—Nixon & Vanderhye P.C.

(57) ABSTRACT

Disclosed is a digital communications network comprising a branched passive optical network connecting a head-end with a plurality of optical network units. The time taken to synchronize by ranging, all optical network units and the head-end, when the network needs to be initialized from scratch, has been minimized using the disclosed method. The synchronization time has been minimized by making all bandwidth in the upstream direction of the network available for the purpose of course ranging. Once the whole network is ranged, the bandwidth is made available, in a normal way, to combined data communications and operations and management functions.

12 Claims, 3 Drawing Sheets

SYNCHRONIZATION IN DIGITAL COMMUNICATIONS NETWORKS

BACKGROUND OF THE INVENTION

1. Field of the Invention

The present invention relates in general to methods and apparatus for data synchronisation in a digital communications network.

2. Related Art

In telephony over a passive optical network (TPON), data from a single head-end or central station (exchange) is "broadcast" as a stream of time division multiplexed (TDM) data frames in the downstream direction, over a branched optical fibre network, to multiple optical network units (ONUs), or terminations, typically in customer premises.

Using TPON as an example, ranging is a known process that enables an ONU to transmit data upstream, for example using a time division multiple access (TDMA) protocol, without it being corrupted by data transmitted by other ONUs. In effect ranging compensates for the difference in transmission times between ONUs and the head-end to prevent data from the ONUs, arising from requests from the head-end, colliding at the head-end.

A system of managing data transport, in particular for TPON, in digital communications networks, including a ranging process, is described in the applicants' European patent EP 318 332 B1. In the system described in this patent, the bandwidth in the upstream and downstream directions is arranged into "multiframes", comprising 80 basic frames (for carrying data and housekeeping information) and two basic frames (the ranging slot) for ranging. European patent specification 0618444A concerns a similar system where however coarse ranging signals from an outstation are transmitted at low magnitudes for the duration of a complete multiframe but sampled at the main station only during a ranging window during which other outstations transmit no data. European patent specification 061443A discusses the use of a quasi-oversampled ranging bit pattern for this purpose.

In this description, where necessary for reasons of clarity, the terms "frame" and "slot" are used interchangeably.

In the ranging process, the round-trip time between the head-end and each ONU is determined and a programmable transmission time delay is added to each ONU so that all ONUs have, effectively, the same round-trip time. Typically, the process needs to be accurate to within one data bit.

Ranging generally takes two forms: coarse ranging and fine ranging. Both forms of ranging use a dedicated ranging slot (in TPON, the ranging slot represents less than 2.5% of the available bandwidth of the system). Coarse ranging takes place typically before "on-line" data communications between the head-end and an ONU can begin. Once coarse ranging is complete, for example to an accuracy of 50 ns for TPON, fine ranging is initiated which brings the accuracy up to within 5 ns (within 1 bit period). Fine ranging then continues to operate during normal, "on-line" communications to compensate for drift in the optical system. In the context of this patent specification, "on-line" encompasses when communications between users of a communications network is possible by, for example, telephony, facsimile, television, etc. "Off-line" communications encompasses, for example, system management communications between components of the communications network, for example coarse ranging. System management communications, such as fine ranging, is also possible during on-line operation, using for example dedicated control channels. However, on-line communications is not possible when, for example, the required ONU or head-end is off-line.

In practice the coarse ranging process typically also involves an initial "levelling" procedure to establish an appropriate optical power level at the ONU. For levelling purposes, in response to a signal from the head-end the ONU transmits one pulse in each of a series of ranging slots at a low optical power and increases the optical power until the head-end receives a pulse within its dynamic range. Only then is the coarse ranging procedure started. The combination of levelling and ranging can result in the ranging slot being used many times by the same ONU to adjust its optical power and obtain a correct delay. For convenience, and unless otherwise stated, references to coarse ranging on start-up should be taken to include levelling.

Using TPON as an example, for a PON having 128 ONUs and implementing 10 ms duration multiframes comprising 82 basic frames of 121.9 $\mu$s duration (only two basic frames in each multiframe being allocated to ranging), ranging for all ONUs would take up to 5.12 seconds, assuming four ranging slots to range one ONU. While around 5 seconds might not seem a long time, if it is considered that this time represents a network down-time or "dead zone", it can be appreciated that it is a significant amount of time, after, for example, a physical re-configuration of a PON or a head-end crash and before communications may be re-established.

Recently, the PON concept has been extended by incorporating optical amplification stages into one or more of the optical fibre branches of a PON. SuperPONs can have a far greater reach than a standard PON, and can serve around 3500 ONUs.

Applying the values of the above ranging example to ranging a SuperPON, ranging would take around 140 seconds. However, in reality ranging for a SuperPON would take much longer when account is taken of the greater reach, and hence the greater round trip delays, of the SuperPON. In fact, the applicants have shown that ranging all ONUs in a SuperPON may take as long as an hour, which as a dead zone is totally unacceptable.

SUMMARY OF THE INVENTION

In accordance with a first aspect, the present invention provides a communications network comprising a central station and a plurality of outstations for transmitting signals on an upstream channel to the central station using time division multiple access (TDMA) and receiving signals on a downstream channel from the central station using time division multiplex (TDM), in which each outstation has timing means for applying to its transmissions a timing adjustment determined by a ranging operation for that station, to compensate for differing transmission delays from the outstations to the central station, and in which the network is operable:

(a) in an operational mode in which the outstations transmit to the central station in a frame structure having a plurality of frames containing traffic data and at least one frame reserved for ranging operations; and (b) in a startup mode in which ranging operations are performed, and in which outstations in respect of which the ranging operation has been performed refrain from transmitting traffic data until after the ranging operation has been performed in respect of further outstations, whereby capacity on said upstream channel is made available to permit more frequent ranging operations than is possible in said operational mode.

The invention has an advantage that initial levelling and ranging can be carried out in the startup mode in which the network is not restricted to using one ranging slot in every n slots (where, as in the example above, a ranging slot is represented by two basic frames and n represents 80 basic frames, and as a result only ¹⁄₄₀th of the available frame time is utilised). In effect there is a rapid exchange of ranging signals between the central station and the outstations and, as a result, network down-time is minimised in the event a whole network requires ranging. In one possible embodiment of the invention, using the above example as a basis, in the second mode the 80 basic frames of the multi-frame would be replaced by 40 ranging frames, representing a 40-fold decrease in the time needed for ranging the whole network (that is to say, ranging could be achieved in around 128 ms). An example of when a whole network needs ranging is in a PON, or a SuperPON, when one head-end fails and a back-up head-end needs to be "switched in".

The invention introduces the concept of fast, or "start-up" ranging where all ONUs, or indeed other types of outstations, are ranged before any "on-line" communications can begin. Obviously, this concept is not limited to TPON, but rather may be applied to any form of broadcast communications network where fast start-up ranging is essential.

In a preferred embodiment of the invention, the transmission paths are provided by a PON. Typically the branches of the PON comprise optical fibre transmission lines and the splits are provided by m:n passive optical splitters. m:n splitters have an advantage over 1:n splitters that multiple (m) inputs allow one or more backup head-end(s), which improves overall network resilience. Furthermore, one or more of the optical fibre branches may comprise or include optical amplification means, for example an optical fibre amplifier. Such amplification extends the reach and/or the split capacity of the optical network.

The skilled person in the art of digital communications will appreciate, as indicated above, that the present invention is applicable to any type of communications network having one or more stations broadcasting data in data frames or slots to multiple outstations and outstations transmitting back to the central station. Such networks may be referred to generically as "point-to-multipoint" communications networks For example, the ranging method might be applied to a geostationary satellite which broadcasts downstream data in slots to a plurality of groundstations, and each groundstation needs to send data upstream in specific slots. The start-up ranging in this instance would be required to establish the respective transmission delays between each groundstation and the satellite before on-line communications could commence. Subsequently, fine ranging would be used in the normal way to compensate for small changes in position of the satellite. The transmission paths in this instance would obviously be line-of-sight paths through space and the Earth's atmosphere. Similarly, the invention may be applied to a scenario including a single groundstation and multiple satellites.

The invention obviously also applies to other configurations of passive optical network, for example a star optical network, and to electrical networks, for example co-axial or copper transmission networks, or to other possible combinations of network or transmission medium type.

In one form of the invention, a head-end, for example, is in communication with a plurality of intermediate stations, for example repeaters, and it is the intermediate stations which are responsible for the ranging of their own set of outstations, for example ONUs. In this case, within the meaning of the invention, the intermediate stations would each act as a central station for the outstations in their separate networks. A system of this type is described in the applicant's copending European patent application 94308676.9, corresponding to International publication No. WO96/16490.

In accordance with a second aspect, the present invention provides a method of operating a communication network comprising a central station and a plurality of outstations, including for transmitting signals on an upstream channel from the outstations to the central station using time division multiple access (TDMA) and transmitting signals on a downstream channel from the central station to the outstations using time division multiplex (TDM), and including performing ranging operations to determine timing adjustments which are applied by the outstations to their transmissions to compensate for differing transmission delays from the outstations to the central station, wherein the method includes the steps of:

(a) in an operational mode, transmitting from the outstations to the central station in a frame structure having a plurality of frames containing traffic data and at least one frame reserved for ranging operations; and (b) in a startup mode, performing ranging operations, and refraining from transmitting traffic data from outstations in respect of which the ranging operation has been performed until after the ranging operation has been performed in respect of further outstations, whereby capacity on said upstream channel is made available to permit more frequent ranging operations than is possible in said operational mode.

BRIEF DESCRIPTION OF THE DRAWINGS

An embodiment of the present invention will now be described in more detail, by way of example only, and with reference to the accompanying drawings, in which.

DETAILED DESCRIPTION OF EXEMPLARY EMBODIMENTS

The following description considers the start-up ranging procedure in accordance with the present invention, of an advanced PON.

The skilled person will appreciate that start-up ranging is independent of how subsequent on-line data communications are managed. For example, the on-line communications may be TPON, which can be managed as described in the applicants' European patent 0318332 referenced above, or might be asynchronous transfer mode-based PON (APON), as described in the applicant's granted European patent 337619B1.

Figure 1:
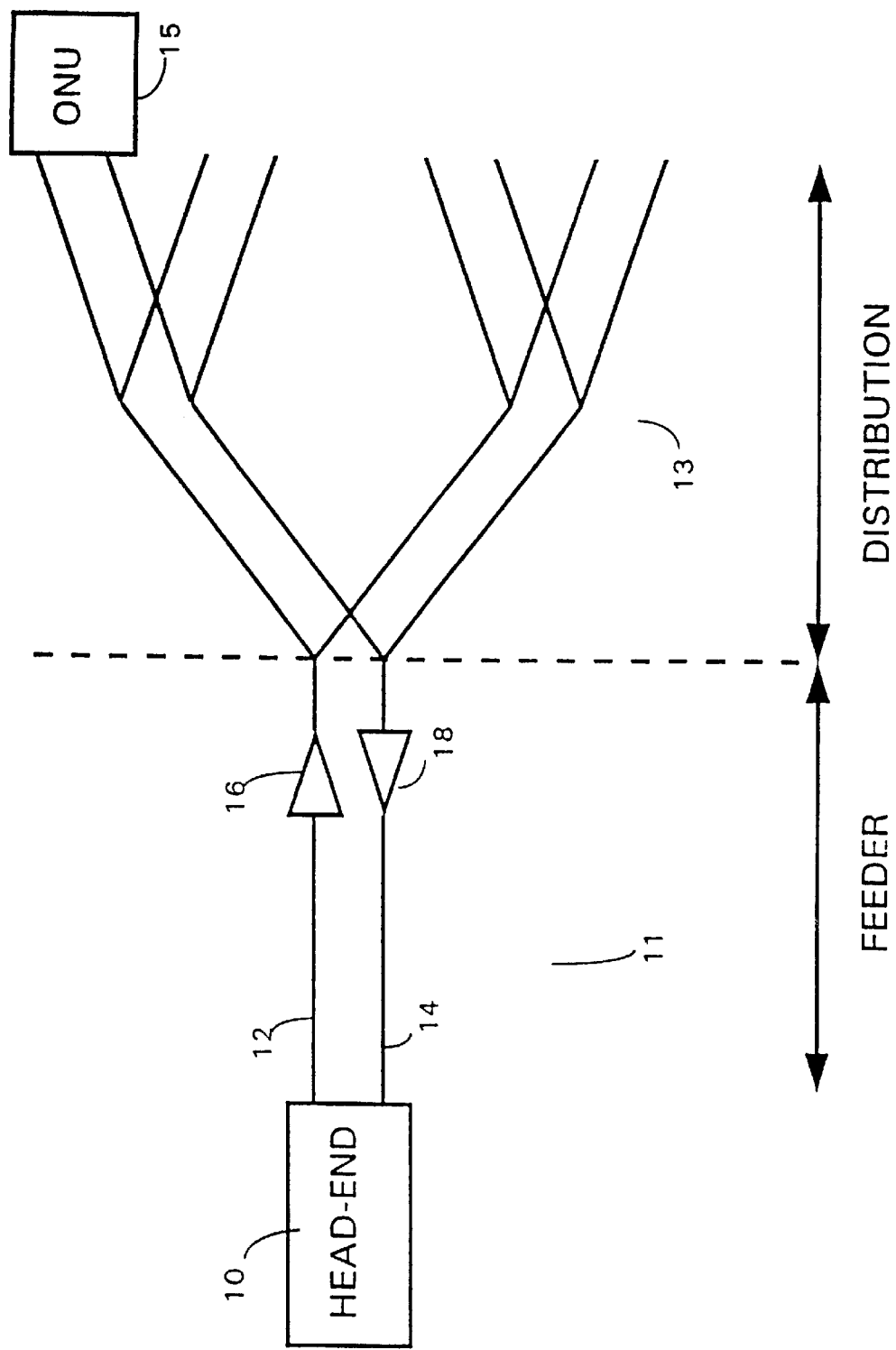
FIG. 1 is a diagram which illustrates the structure of an advanced PON.

FIG. 1 shows a schematic diagram of an advanced PON in which start-up ranging might be implemented. The network achieves full duplex operation using parallel upstream and downstream simplex paths. The use of separate upstream and downstream paths is technically the simplest solution to full duplex operation since there is no cross-talk between upstream and downstream channels. However, the use of parallel networks does incur extra costs due to the requirement for double the amount of optical fibre in the PON compared with a single fibre, for example, WDM arrangement, where upstream and downstream channels travel over the same optical fibres in opposite directions at different wavelengths.

The advanced PON comprises a head-end 10, a feeder network 11, a distribution network 13 and customer ONUs 15, only one of which is shown for the sake of clarity. The feeder network 11 comprises downstream and upstream feeders, referenced 12 and 14 respectively, which extend the reach of the PON. An optical amplifier 16 and a repeater 18 are included in the feeder network 11 to enable the PON to have a large split, to potentially many thousands of ONUs and a long reach, potentially extending to many hundreds of kilometres.

The downstream amplifier 16 is an erbium-doped fibre amplifier, of known type. A digital repeater 18 in the upstream is used to reduce the noise that is transmitted upstream. The downstream data transport is a TDM signal, whilst the upstream data transport is TDMA, with data being packetised.

Figure 2:
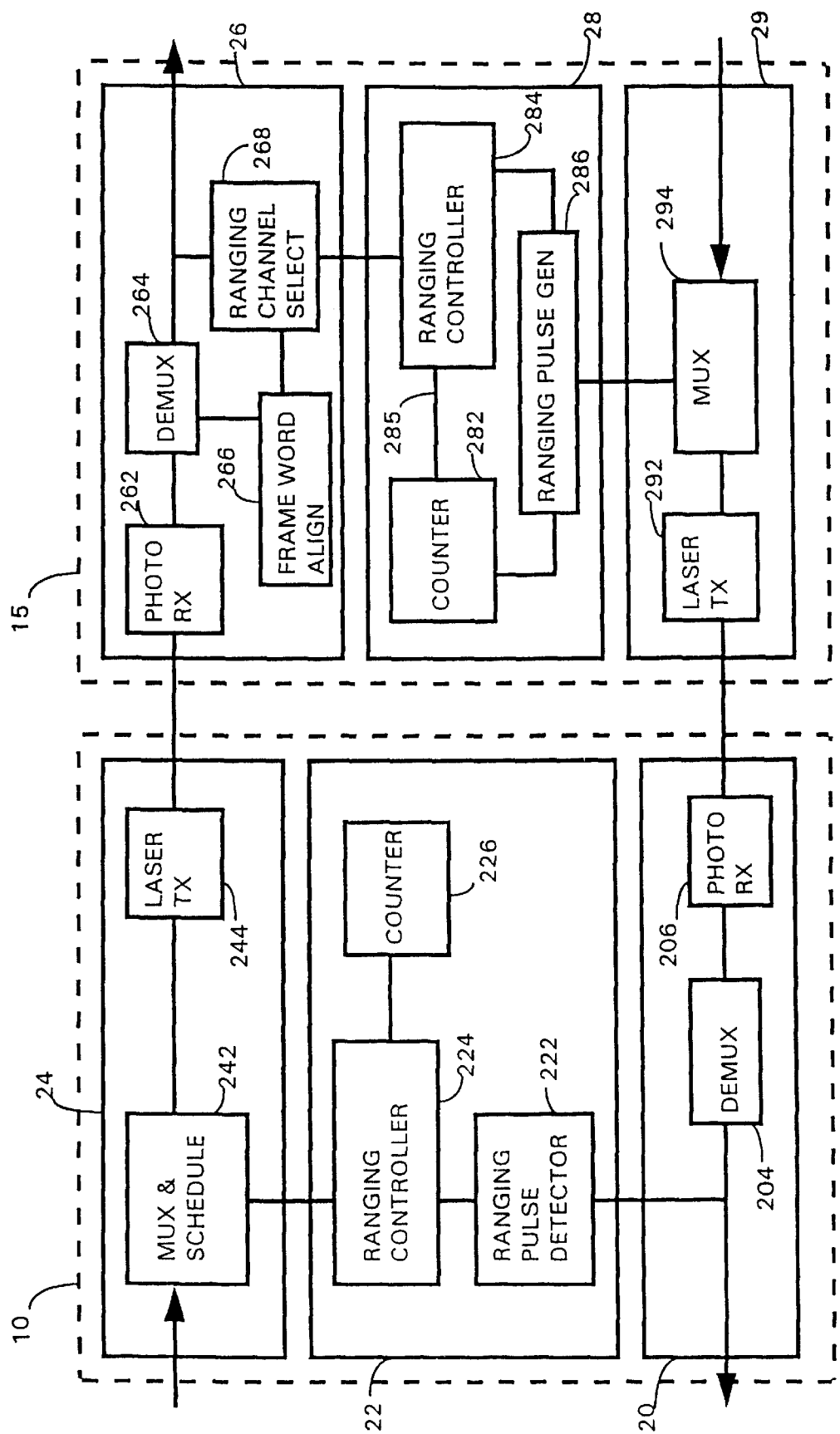
FIG. 2 is a block diagram which represents the advanced PON of FIG. 1.

FIG. 2 shows a block diagram of the functional elements, used for start-up ranging, in a PON head-end 10 and in a single ONU 15. The head-end 10 comprises three sections, namely an upstream section 20, a ranging control section 22 and a downstream section 24.

The upstream section comprises a photo-receiver 206, and a demultiplexer 204 connected to the photo-receiver. The photo-receiver 206 receives upstream optical data from the ONU 15 which it converts into an electrical signal. The electrical signal passes to the demultiplexer 204 which separates data channels from different ONUs.

The ranging control section 22 comprises a ranging controller 224, connected to which are a counter 226 and a ranging pulse detector 222. The demultiplexed signal from the demultiplexer 204 passes to the ranging pulse detector 222 in the ranging control section 22 of the head-end 10. During initial start-up ranging, the only data received are ranging pulses from ONUs, hence the detector 222 needs only to be able to detect an electrical pulse. For example, it may be a simple trigger circuit.

A detection signal, generated by the ranging pulse detector 222 when it receives a ranging pulse, passes to the ranging controller 224. The ranging controller 224 also receives a timing signal from the counter 226.

The downstream section 24 includes a multiplexer 242, and a laser transmitter 244 connected to the multiplexer 242. The multiplexer is also connected to the ranging controller 224. The multiplexer combines downstream electrical data channels from a trunk network (not shown) and an electrical ranging control channel received from the ranging controller 224. The laser transmitter 244 transmits the electrically multiplexed signal downstream as an optical signal.

The ONU 15 comprises three sections, which are in effect similar to the sections in the head-end 10. The three sections are a downstream section 26, a ranging control section 28 and an upstream section 29.

The ONU downstream section 26 includes a photo-receiver 262, a demultiplexer 264 which is connected to the photo-receiver 262, a frame word alignment detector 266 which is connected to the demultiplexer 264, and a ranging channel selector 268 which is connected to the frame word alignment detector 266 and is also connected to the demultiplexer 264.

A converted optical-to-electrical signal from the photo-receiver 262 passes to the demultiplexer 264. The demultiplexed signal passes to the frame alignment word detector 266 which identifies a frame alignment word in a frame alignment channel generated by the head-end 10 in all downstream communications. The ranging channel selector 268 selects, from the demultiplexed signal, the ranging control channel generated by the head-end ranging controller 224. This selection is made possible because the position of the ranging channel in relation to the frame alignment channel is a pre-determined relationship which is programmed into the ranging channel selector.

The ranging control section 28 comprises a ranging controller 284 connected to the ranging channel selector 268, a counter 282 in connection with the ranging controller 284, and a ranging pulse generator 286 connected to both the counter 282 and the ranging controller 284.

In the ONU ranging control section 28, the ranging information in the selected ranging channel is received by the ranging controller 284. The ranging controller 284 controls a counter re-set line 285 connected to the counter 282. The counter 282 is in synchronism with the head-end counter 226. Synchronism is achieved using simple electrical circuitry (not shown) which detects bit inversions in the downstream data signal. The ranging pulse generator 286 is controlled by the ranging controller 284, and receives its timing from the counter 282, as described below.

The ONU downstream section 26 comprises a multiplexer 264 which is connected to a packetiser (not shown) and the ranging pulse generator 286, and a photo-receiver 262 which is connected to the multiplexer.

In the ONU upstream section 29, the multiplexer 294 combines a ranging pulse provided by the ranging pulse generator 286 with upstream data channels, from the packetiser (not shown). The data is transmitted upstream by the laser transmitter 292.

The counters 226 and 282 are arranged to have equal fixed count periods during which time they accumulate, or count. At the beginning of each period, the counters reset to zero. The fixed periods are arranged to be at least as great as the maximum round trip delay between the head-end 10 and the ONU 15. For example, the maximum round trip delay for a 300 km SuperPON is 3 ms, in which case the count period for both counters would be set to 3 ms. Typically, both counters take their timing from a system clock (not shown) which synchronises the whole network. However, the system clock runs at a far higher bit rate, for example at up to 1.2 Gbit/s, than that required for the counters, and therefore the counter rate is divided down to a count of 1.2/n Gbitis, where n is an integer value.

The number of counts per period determines the accuracy of the start-up ranging process. For example, 125000 counts per period enables start-up ranging accuracy to 16 bits (assuming a 2 Mbit/s ranging channel), in which case the value of n is 9600.

Figure 3:
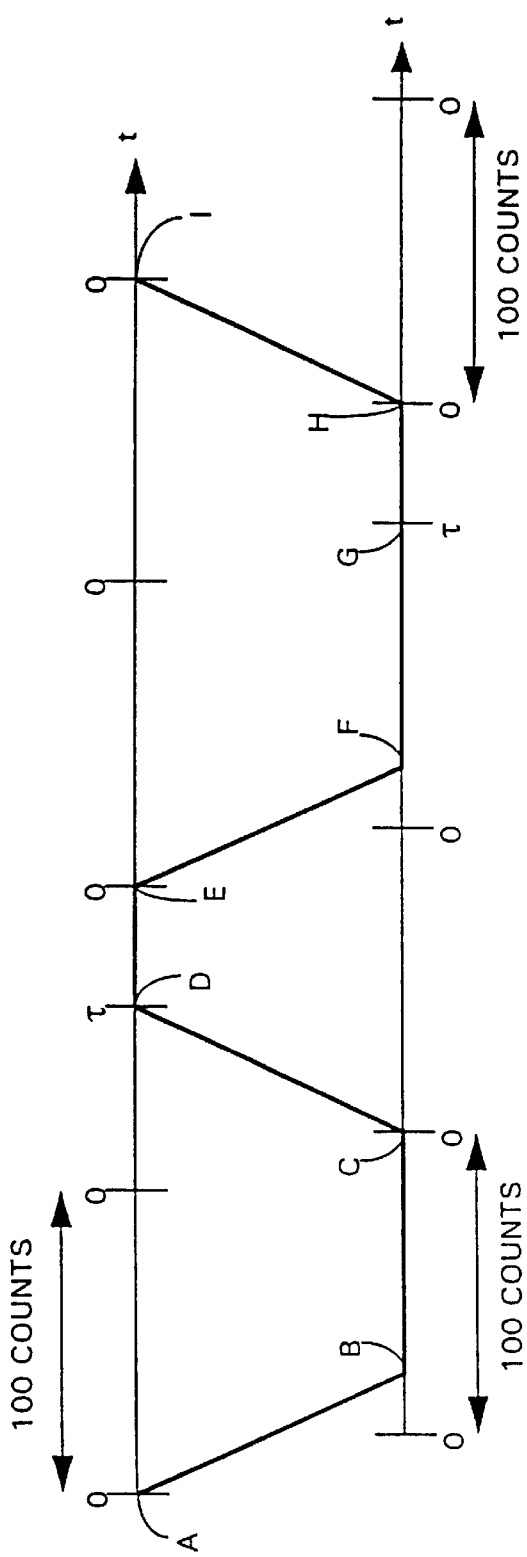
FIG. 3 is a timing diagram which illustrates the pipelined nature of start-up ranging of a single ONU of the advanced PON of FIG. 1.

An example of the start-up ranging procedure will now be described with reference to the timing diagram in FIG. 3. In FIG. 3, which is not to scale, it is assumed that the head-end and ONU counters 226 and 282 are synchronous but not in phase with each other.

For simplicity, an arbitrary count cycle of 100 counts per period will be used to demonstrate how start-up ranging is achieved.

At point A (in FIG. 3), the head-end ranging controller 224 sends a ranging control signal (the form of which is described below in more detail), to the downstream section 24 of the head-end 10, to be forwarded in a downstream multiplexed signal to the ONU 15.

The multiplexed signal is received by the photo-receiver 292 in the ONU 15. The ranging control signal is extracted by the ranging channel selector 268 and forwarded to the ONU ranging controller 284, which receives the signal, at point B.

The ranging control signal sets the ONU ranging controller 284 into its ranging mode.

The ONU ranging controller 284 instructs the ranging pulse generator 286 to return a ranging pulse, via the upstream section 29 of the ONU 15, to the head-end 10. The ranging pulse generator 286 awaits the next reset (or zero count) of the counter 282 and, at point C, generates the ranging pulse to be transmitted to the head-end 10.

On receipt of the ranging pulse, the ranging pulse detector 222 signals to the ranging controller 224 that the ranging pulse has arrived, at point D.

The ranging controller 224 associates the arrival of the pulse (point D) with a count value τ from the counter 226. The count value τ, at point D, equals the number of counts by which transmission by the ONU 15 should be delayed to ensure that a pulse transmitted from the ONU at a count value of zero at the counter 282 reaches the head-end 10 at a count value of zero at the counter 226.

To effect such a delay, the head-end ranging controller 224, at point E, provides a message to be transmitted to the ONU ranging controller 284, which informs the ONU ranging controller to delay upstream transmission by the appropriate value τ.

The message from the head-end ranging controller 224 is received by the ONU ranging controller 284, at point F. The next time the counter 282 should reset to zero, at point G, the ranging controller 284 signals to the counter 282 to reset to a count value of τ, thus providing a count delay of τ.

Thus, the next time a ranging pulse is transmitted by the ONU 1 5 at a counter value of zero, point H, of the counter 282, the pulse should arrive at the head-end 10 when the head-end counter 226 is also at zero, at point I.

In accordance with the above ranging process, an ONU in a 300 km SuperPON can be ranged in as little as 12 ms.

For 3500 ONUs, this would allow full ranging, ignoring levelling, in just over 30 seconds.

In practice, the system cannot be assumed to be noise-free, and checks should be performed. This might lengthen the ranging cycle of a single ONU to 15 ms, increasing the total time to range to just under 1 min. To achieve ranging in this time requires all available upstream bandwidth, that is, no data traffic can be transmitted on the upstream.

Figure 4:
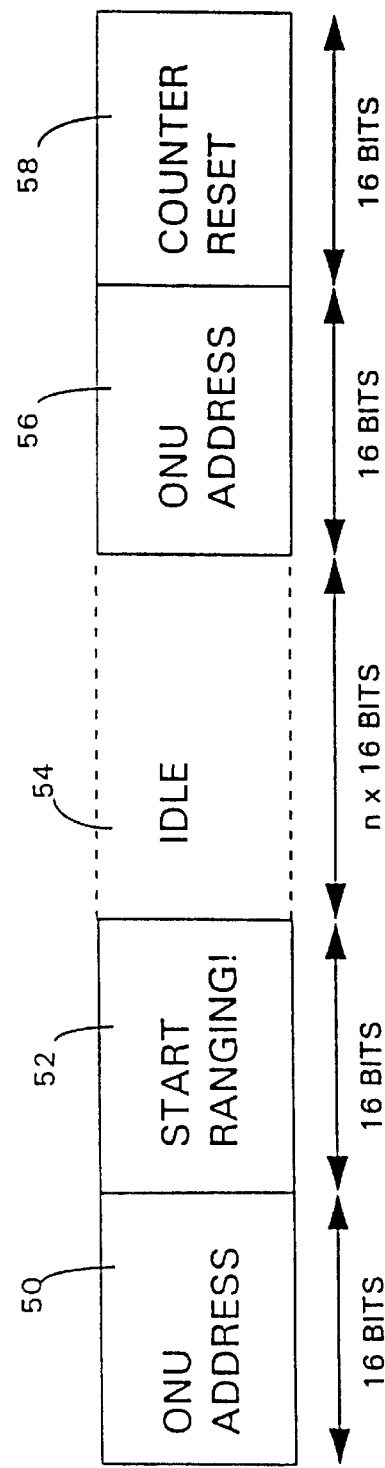
FIG. 4 shows the data sequence from the head-end to an ONU to affect start-up ranging.

FIG. 4 illustrates the information broadcast by a head-end to initiate start-up ranging. It should be remembered that no on-line data interchange is taking place and that all ONUs in the PON are in a standby mode, "listening" for a broadcast from the head-end.

The information generated by the ranging controller includes a 2-byte field 50 containing an ONU address, which identifies which ONU is to be ranged, and a 2-byte field 52 which all ONUs recognise as a "start ranging" control command. All ONUs receive this broadcast information, but only the one which is identified in the address field reacts by returning a ranging pulse. Having sent the ONU address and ranging command, the head-end 10 waits for a return signal. The waiting time is known as an idle time 54, since the head-end does nothing, unless of course no response occurs within a pre-determined "failure" time.

On receipt of the ranging pulse, the head-end ranging control 224 calculates the amount of required delay and then addresses the same ONU in a further 2-byte address field 56 followed by a 2-byte reset value field 58 containing the delay τ, in number of counts. The ranging procedure may be repeated for the same ONU to check that correct counter alignment has been achieved.

Once the head-end 10 is satisfied that an ONU has been ranged, the next ONU is addressed.

When all ONUs have been successfully start-up ranged, fine ranging, if required, and on-line data communications including fine, corrective ranging can proceed, as described, for example in the Applicants' European patent EP 318 332 B1, referenced above.

Although FIG. 2 represents a system suitable for start-up ranging in accordance with the present invention, the head-end upstream and downstream sections, 20 and 24, and the ONU downstream and upstream sections, 26 and 29, are used for both start-up ranging and subsequent off-line and on-line communications. The ranging control sections 22 and 28 are however used substantially only for start-up ranging purposes, with the exception of the counter 282. The ranging controllers 224 and 284 could be realised in software in suitable programmable computers. However, the high speed of the communications involved (although not as high as the main upstream and downstream data rates) would typically warrant the use of custom-built hardware circuits.

The counter 282 has a further connection (not shown) to an upstream scheduler (not shown) in the ONU. Once start-up ranging is completed, the upstream scheduler receives the count value from the counter 282, in combination with any other ranging, for example fine ranging. The scheduler buffers upstream data and forwards it to the multiplexer 294 to be transmitted upstream at the correct time. Typically, data is sent upstream at a fixed offset, which is different for each ONU, from the zero count of the counter 282. The offset for each ONU is determined by the head-end.

The method and apparatus described above reflect one simple embodiment of how start-up ranging may be achieved. The teaching in the description may be adapted by the skilled person to suit many variants of the invention without moving outside the essence of the invention. For example, synchronisation may be achieved using a synchronisation reference signal from the head-end rather than relying on the need to synchronise an ONU counter with a head-end counter. However, it is believed that the present description reflects one of the simplest ways of achieving start-up ranging.

The skilled person will appreciate that whilst the foregoing example of start-up ranging is specific to a digital communications network incorporating a PON, the concept of start-up ranging described in detail in this specification can be applied to any form of network incorporating a central station which broadcasts information to multiple outstations, where outstation communications with the central station is susceptible to initial synchronisation using start-up ranging.

What is claimed is:

1. A communications network comprising a central station and a plurality of outstations for transmitting signals on an upstream channel to the central station using time division multiple access and receiving signals on a downstream channel from the central station using time division multiplex, in which each outstation has timing means for applying to its transmissions a timing adjustment determined by a ranging operation for that station, to compensate for differing transmission delays from the outstations to the central station, and in which the network is operable:

(a) in an operational mode in which the outstations transmit to the central station in a frame structure having a plurality of frames containing traffic data and at least one frame reserved for ranging operations; and (b) in a start-up mode in which ranging operations are performed, and in which outstations in respect of which the ranging operations has been performed refrain from transmitting traffic data until after the ranging operation has been performed in respect of further outstations, whereby capacity on said upstream channel is made available to permit more frequent ranging operations than is possible in said operational mode.

2. A communications network according to claim 1, in which the central station comprises:

means for transmitting a first signal to a given outstation; and means responsive to the time of receipt of a second signal from the outstation to determine the time difference between the actual time of receipt of the second signal and a required time for receipt and for transmitting to the outstation a third signal representative of the difference, and each outstation comprises:

means responsive to the receipt of said first signal to transmit said second signal at a reference time; and means responsive to said third signal to change said reference time such that subsequent signals from the outstation arrive at the required time.

3. A network according to claim 2, in which the central station has a cyclic counter;

each outstation has a cyclic counter having a controllable phase relationship with the cyclic counter at the central station and arranged to be synchronized to the counter of the central station, and at each outstation the means to change the reference time changes the phase of the cyclic counter associated with that outstation relative to the phase of the cyclic counter associated with the central station, wherein the phase change to the cyclic counter associated with the outstation is an amount determined by the third signal.

4. A network according to claim 1, wherein the channels are provided by a passive optical network.

5. A network according to claim 4, wherein the passive optical network comprises at least one optical fiber branch which includes optical amplification means.

6. A method of operating a communication network comprising a central station and a plurality of outstations, including for transmitting signals on an upstream channel from the outstations to the central station using time division multiple access and transmitting signals on a downstream channel from the central station to the outstations using time division multiple, and including performing ranging operations to determine timing adjustments which are applied by the outstations to their transmissions to compensate for differing transmission delays from the outstations to the central station, wherein the method comprises:

(a) in an operational mode, transmitting from the outstations to the central station in a frame structure having a plurality of frames containing traffic data and at least one frame reserved for ranging operations; and (b) in a start-up mode, performing ranging operations, and refraining from transmitting traffic data from outstations in respect of which the ranging operation has been performed until after the ranging operation has been performed in respect of further outstations, whereby capacity on said upstream channel is made available to permit more frequent ranging operations than is possible in said operational mode.

7. A method according to claim 6 in which the ranging operation further comprises the steps of:

a. transmitting a first signal from the central station to a given outstation to cause the outstation to return a second signal at a reference time to the central station;

b. receiving at the central station the second signal, determining the time difference between the actual time of receipt of the second signal and a required time for receipt and generating a third signal for causing the outstation to change said reference time such that subsequent signals from the- outstation arrive at the required time, wherein said operation is repeated for each outstation in the network.

8. A method according to claim 6, in which the central station has a cyclic counter and each outstation has a cyclic counter synchronized to the counter of the central station and the said change of the reference time for any outstation is effected by changing the phase of the cyclic counter associated with that outstation relative to phase of the cyclic counter associated with the central station.

9. A method according to claim 6, wherein the channels are provide by a passive optical network.

10. A method according to claim 9, wherein the passive optical network comprises at least one optical fiber branch which includes optical amplification means.

11. A communications network comprising a central station and a plurality of outstations for transmitting signals on an upstream channel to the central station using time division multiple access and receiving signals on a downstream channel from the central station using time division multiplex, in which each outstation has timing means for applying to its transmissions a timing adjustment determined by a ranging operation for that station, to compensate for differing transmission delays from the outstations to the central station, and in which the network is operable:

(a) in an operational mode in which the outstations transmit to the central station in a frame structure in which a plurality m of frames containing traffic data and n frames reserved for ranging operations form a multiframe of given duration, n and m being integers, m being greater than n and n being 1 or more, (b) in a start-up mode in which ranging operations are performed, and in which outstations in respect of which the ranging operation has been performed refrain from transmitting traffic data until after the ranging operation has been performed in respect of further outstations, so that in place of frames containing traffic data an increased number, p, of ranging frames occur in a multi-frame of said given duration, p being greater than n.

12. A method of operating a communication network comprising a central station and a plurality of outstations, including for transmitting signals on an upstream channel from the outstations to the central station using time division multiple access and transmitting signals on a downstream channel from the central station to the outstations using time division multiplex, and including performing ranging operations to determine timing adjustments which are applied by the outstations to their transmission to compensate for differing transmission delays from the outstations to the central station, wherein the method comprises:

(a) in an operational mode, in which transmission between the outstations and the central station is arranged as a sequence, m, of multi-frames, each multi-frame being of a given duration, having a plurality of frames containing traffic data and n frames reserved for ranging operations, m and n being integers, m being greater than n, and n being one or more;

(b) in a start up mode, performing ranging operations, and refraining from transmitting traffic data from outstations in respect of which the ranging operation has been performed until after the ranging operation has been performed in respect of further outstations, so that within a multi-frame of said given duration, in place of frames containing traffic data additional frames are available for ranging so that the rate of ranging during the start up mode can be increased compared to that possible in the operational mode.

* * * * *

UNITED STATES PATENT AND TRADEMARK OFFICE
CERTIFICATE OF CORRECTION

| | | |
|---|---|---|
| PATENT NO. | : 6,262,997 B1 | |
| APPLICATION NO. | : 08/981586 | |
| DATED | : July 17, 2001 | |
| INVENTOR(S) | : John Alan Quayle | |

It is certified that error appears in the above-identified patent and that said Letters Patent is hereby corrected as shown below:

In column 9, line 54 (claim 6), replace "multiple" with --multiplex--.

Signed and Sealed this
Fourth Day of September, 2012

David J. Kappos
*Director of the United States Patent and Trademark Office*